United States Patent [19]
Shiomi et al.

[11] Patent Number: 5,225,865
[45] Date of Patent: Jul. 6, 1993

[54] CAMERA

[75] Inventors: Yasuhiko Shiomi; Kiyoshi Alyfuku; Kazuyuki Maeda, all of Kanagawa, Japan

[73] Assignee: Canon Kabushiki Kaisha, Tokyo, Japan

[21] Appl. No.: 787,724

[22] Filed: Nov. 1, 1991

Related U.S. Application Data

[63] Continuation of Ser. No. 642,128, Jan. 14, 1991, abandoned, which is a continuation of Ser. No. 307,336, Feb. 6, 1989, abandoned.

[30] Foreign Application Priority Data

Feb. 10, 1988 [JP] Japan .................. 63-027684
Mar. 22, 1988 [JP] Japan .................. 63-067893
Apr. 8, 1988 [JP] Japan .................. 63-086949

[51] Int. Cl.[5] .................. G03B 7/00; G03B 17/00
[52] U.S. Cl. .................. 354/412; 354/400; 354/456; 354/214; 354/268
[58] Field of Search .............. 354/402, 405, 412, 465, 354/471, 289.1, 289.12, 468, 484, 266, 268, 226, 234.1, 235.1, 456, 400, 173.1, 173.11, 214

[56] References Cited

U.S. PATENT DOCUMENTS 4,156,563 5/1979 Kato et al. .................. 354/405
4,389,111 6/1983 Uchidoi et al. .............. 354/268 X
4,636,055 1/1987 Alyfuku .................... 354/465

FOREIGN PATENT DOCUMENTS 60-263129 12/1985 Japan.

Primary Examiner—W. B. Perkey
Attorney, Agent, or Firm—Robin, Blecker, Daley & Driscoll

[57] ABSTRACT

A camera includes an abnormal state detecting circuit for detecting an abnormal state of the camera, a counter for counting the number of times for which the abnormal state of the camera is detected by the abnormal state detecting circuit, and a setting instruction circuit for setting the camera into an operation inhibiting mode in response to a counted value of the counter when the abnormal state of the camera has been detected by the abnormal state detecting circuit a predetermined plural number of times.

19 Claims, 10 Drawing Sheets

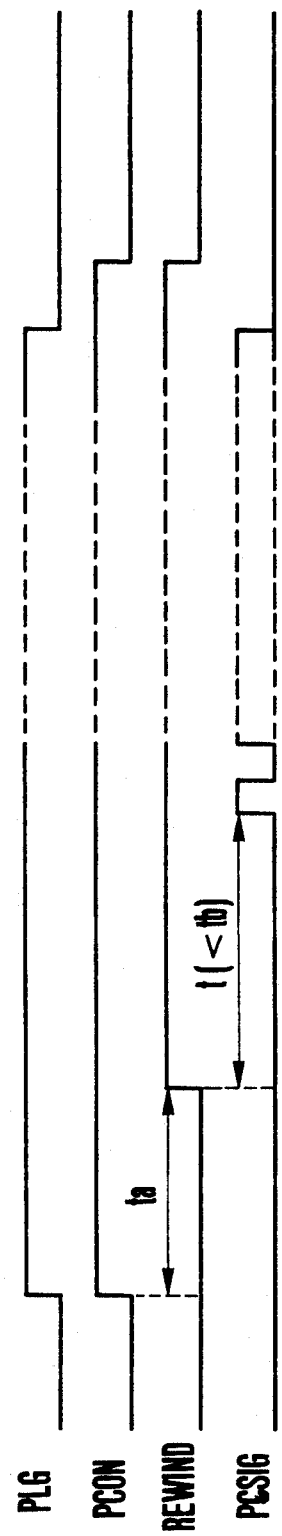
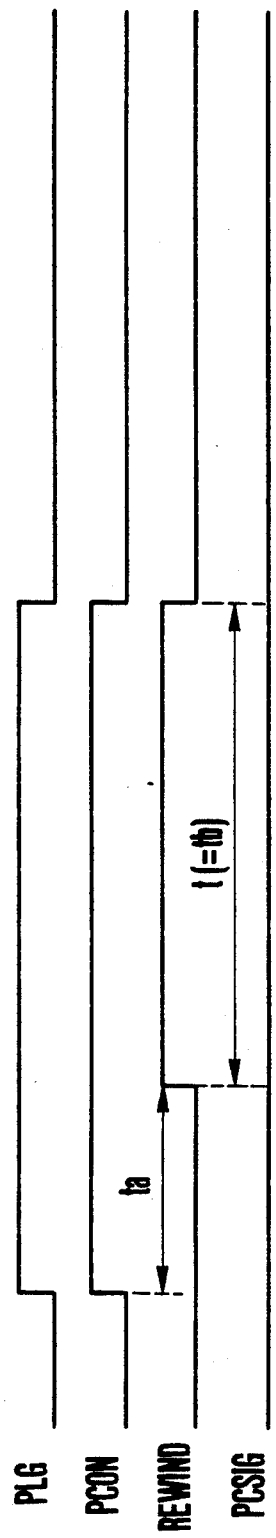

CAMERA

This is a continuation application under 37 CFR 1.62 of prior application Ser. No. 642,128, filed Jan. 14, 1991, which is a continuation of application Ser. No. 307,336, filed Feb. 6, 1989, both now abandoned.

BACKGROUND OF THE INVENTION

1. Field of the Invention

This invention relates to an improvement on a camera of the kind arranged to be set in an inoperative state in which no external input is accepted in cases where a lens shifting member, a shutter operating member or the like fails to normally operate after a release signal is generated.

2. Description of the Related Art

The camera of this kind is arranged to have a lens barrel, a shutter operating member, etc. immediately cancelled from a mechanically locked state and allowed to begin to operate when a release signal is generated in response to a release operation. However, in cases where the lens barrel or the shutter operating member is found to be not normally operating due to some mechanical disorder, the conventional camera is immediately brought into an inoperative state in which no external input is accepted. This arrangement is disclosed, for example, in Japanese Laid-Open Patent Application No. SHO 62-270933, etc.

However, the conventional arrangement to immediately render the camera inoperative when the lens barrel or the shutter operating member fails to normally operate, for example, due to a fault of a plunger or the like even when the release operation is performed just once, presents the following problem: The camera would be set too often into the inoperative state. Then, to cancel this state, the battery of the camera must be taken out and again loaded each time. In a case where the camera has long been left unused in particular, such members often come to normally operate when the release operation is repeated after they have first failed to normally respond to the release operation. Therefore, the conventional arrangement has not been practical.

SUMMARY OF THE INVENTION

This invention is directed to the solution of the above-stated problem of the prior art. It is therefore an object of the invention to provide a camera which is practical and excels in operability as it does not immediately inhibit its operation upon detection of the above-stated abnormal state but is arranged to be set into an operation inhibiting mode only when the camera is confirmed to be really out of order after the above-stated abnormal state is detected a plurality of times. To attain this object, a camera according to the invention comprises: abnormal state detecting means for detecting an abnormal state of the camera; counting means for counting the number of times for which the abnormal state of the camera is detected by the abnormal state detecting means; and setting instruction means for setting the camera into an operation inhibiting mode in response to a counted value of the counting means when the abnormal state of the camera has been detected by the abnormal state detecting means a predetermined plural number of times.

Other objects and features of the invention will become apparent from the following detailed description of embodiments thereof taken in connection with the accompanying drawings.

BRIEF DESCRIPTION OF THE DRAWINGS

FIGS. 5(a) and 5(b) are time charts showing the operation of the same embodiment.

DETAILED DESCRIPTION OF THE PREFERRED EMBODIMENTS

Figure 1:
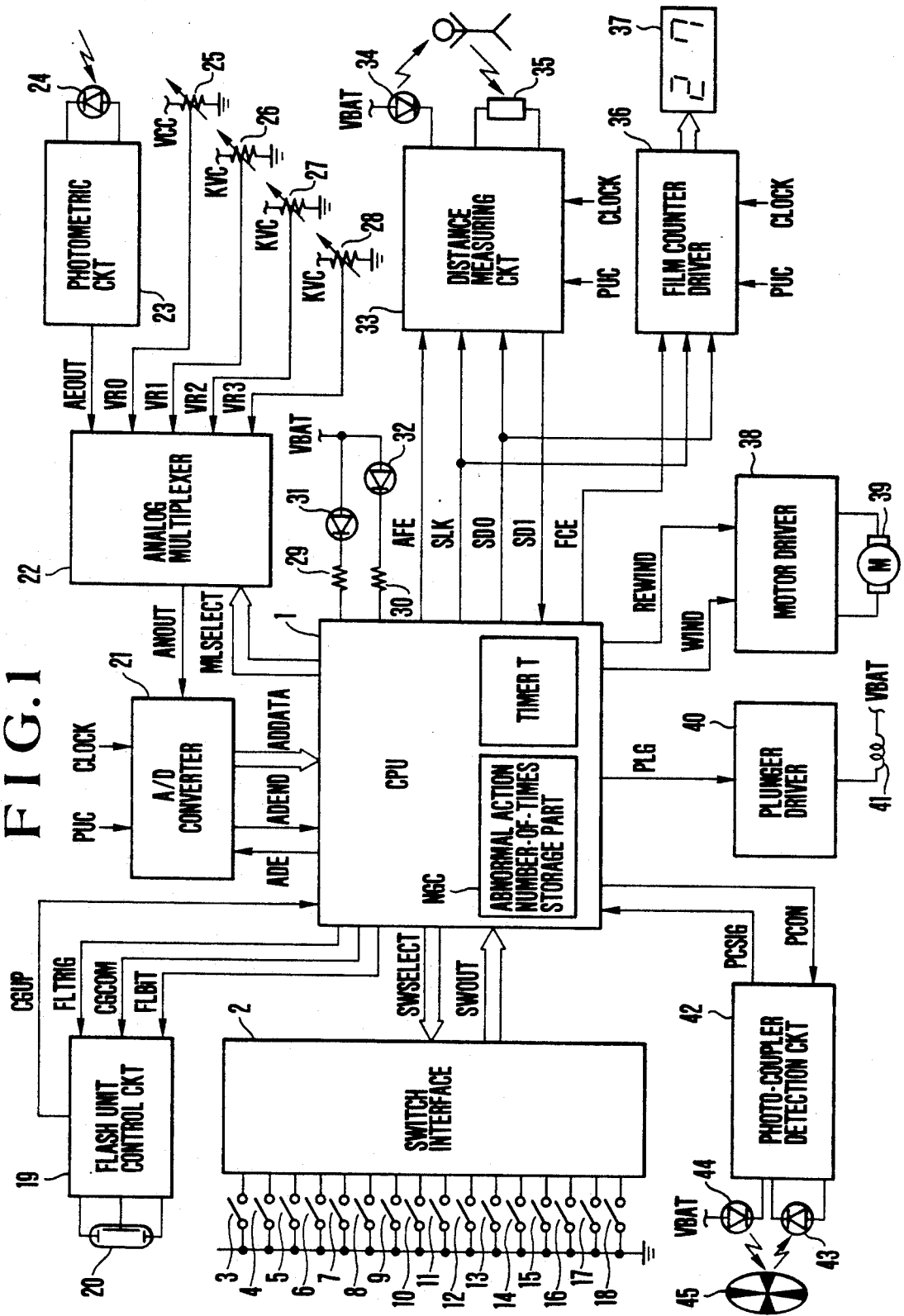
FIG. 1 is a block diagram showing in its entirety a camera arranged according to this invention as an embodiment thereof.

The following describes the details of this invention through embodiments thereof with reference to the accompanying drawings:

FIG. 1 is a block diagram showing a camera arranged as an embodiment of the invention. Referring to FIG. 1, a CPU 1 has a timer T and an abnormal action number-of-times storage part NGC which is arranged to count the number of times for which an abnormal action of a lens barrel is detected and to store the counted value thus obtained. The illustration includes a switch interface 2; various mechanical switches 3 to 18 disposed inside the camera and including a release switch; a flash unit control circuit 19; a flash tube 20; an A/D converter 21; an analog multiplexer 22; a photometric circuit 23; a photometric sensor 24; adjusting volume resistors 25 to 28; current limiting resistors 29 and 30; LEDs 31 and 32; a distance measuring circuit 33; an iRED 34 (infrared ray emitting diode); a light receiving element 35 (distance measuring sensor); a film counter driver 36; a film counter 37; a motor driver 38; a motor 39; a plunger driver 40; a plunger 41; a photo-coupler detection circuit 42; a light receiving element 43 for the photo-coupler; an LED 44 for the photo-coupler; and a pulse disc 45.

Figure 2A:
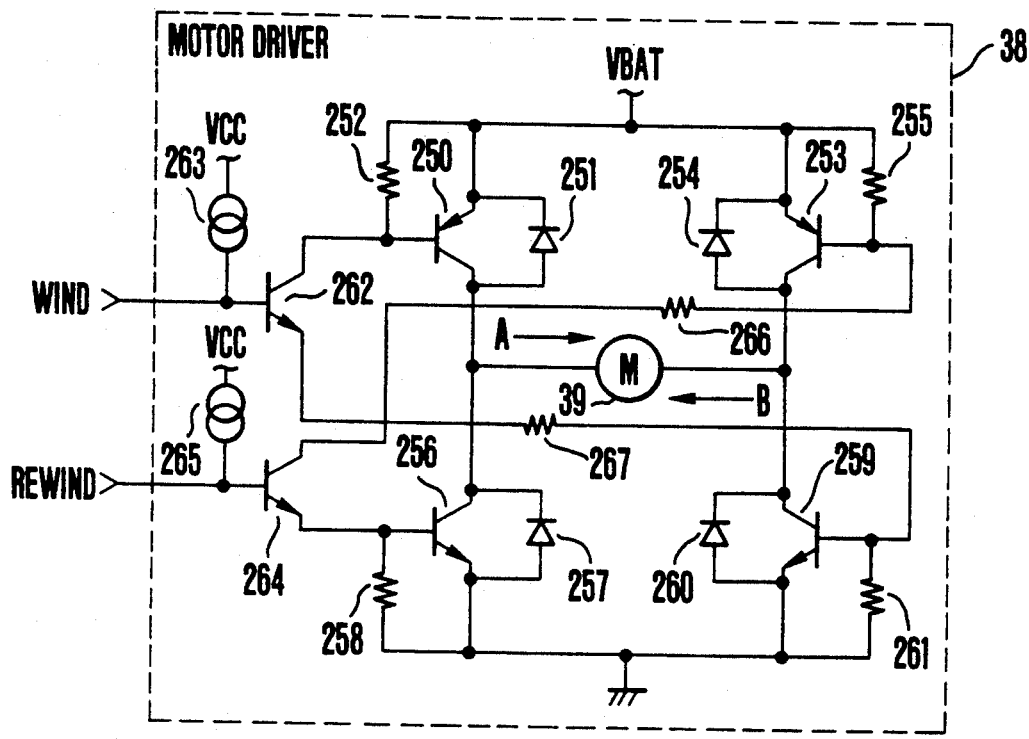
FIGS. 2(a), 2(b) and 2(c) are circuit diagrams showing by way of example the details of various component parts of the embodiment shown in FIG. 1.
Figure 2B:
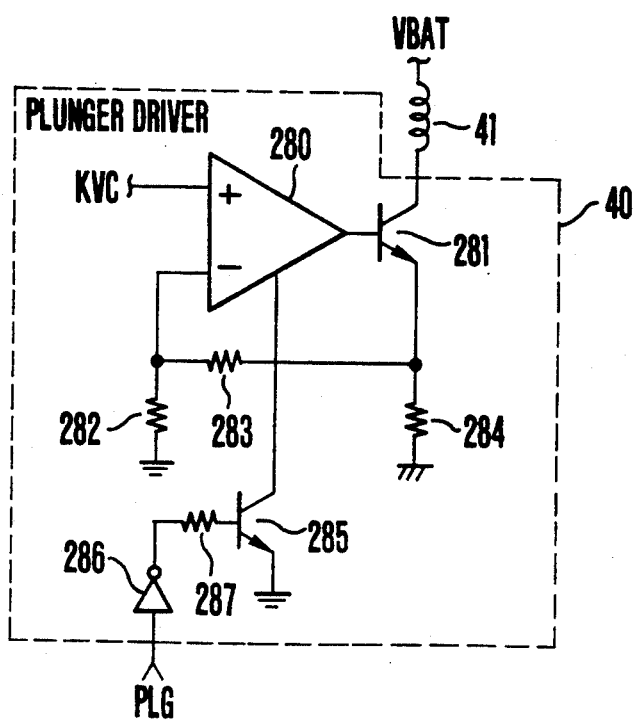
Figure 2C:
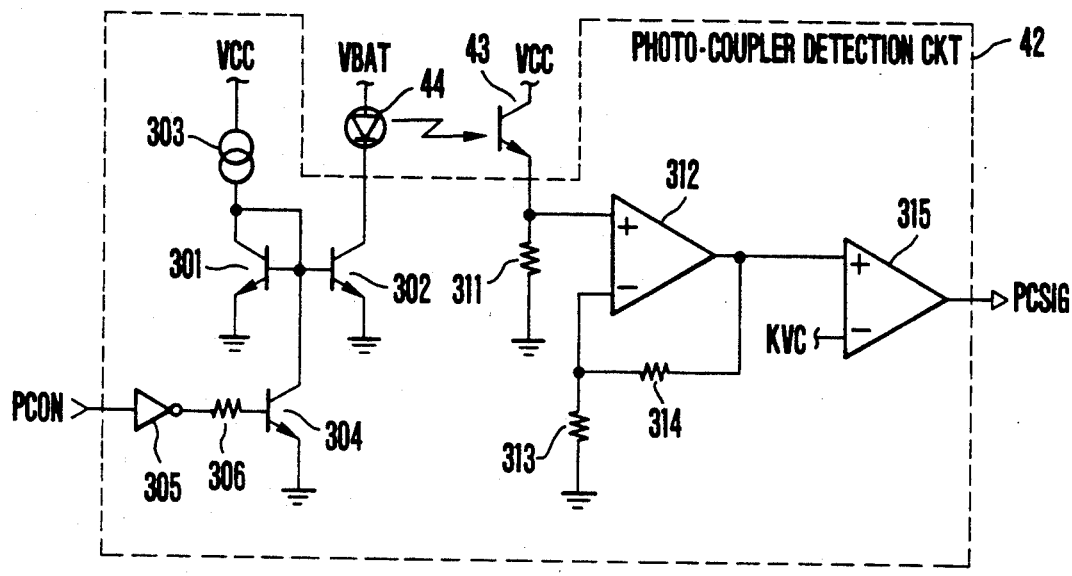

FIGS. 2(a) to 2(c) show by way of example the details of arrangement of various parts of FIG. 1. Among these figures, FIG. 2(a) shows the motor driver 38; FIG. 2(b) the plunder driver 40; and FIG. 2(c) the photo-coupler detection circuit 42.

Figure 4:
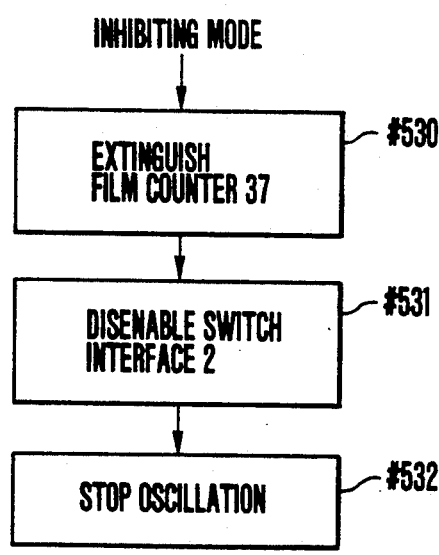
FIGS. 3 and 4 are flow charts showing the operation of the same embodiment.
Figure 3:
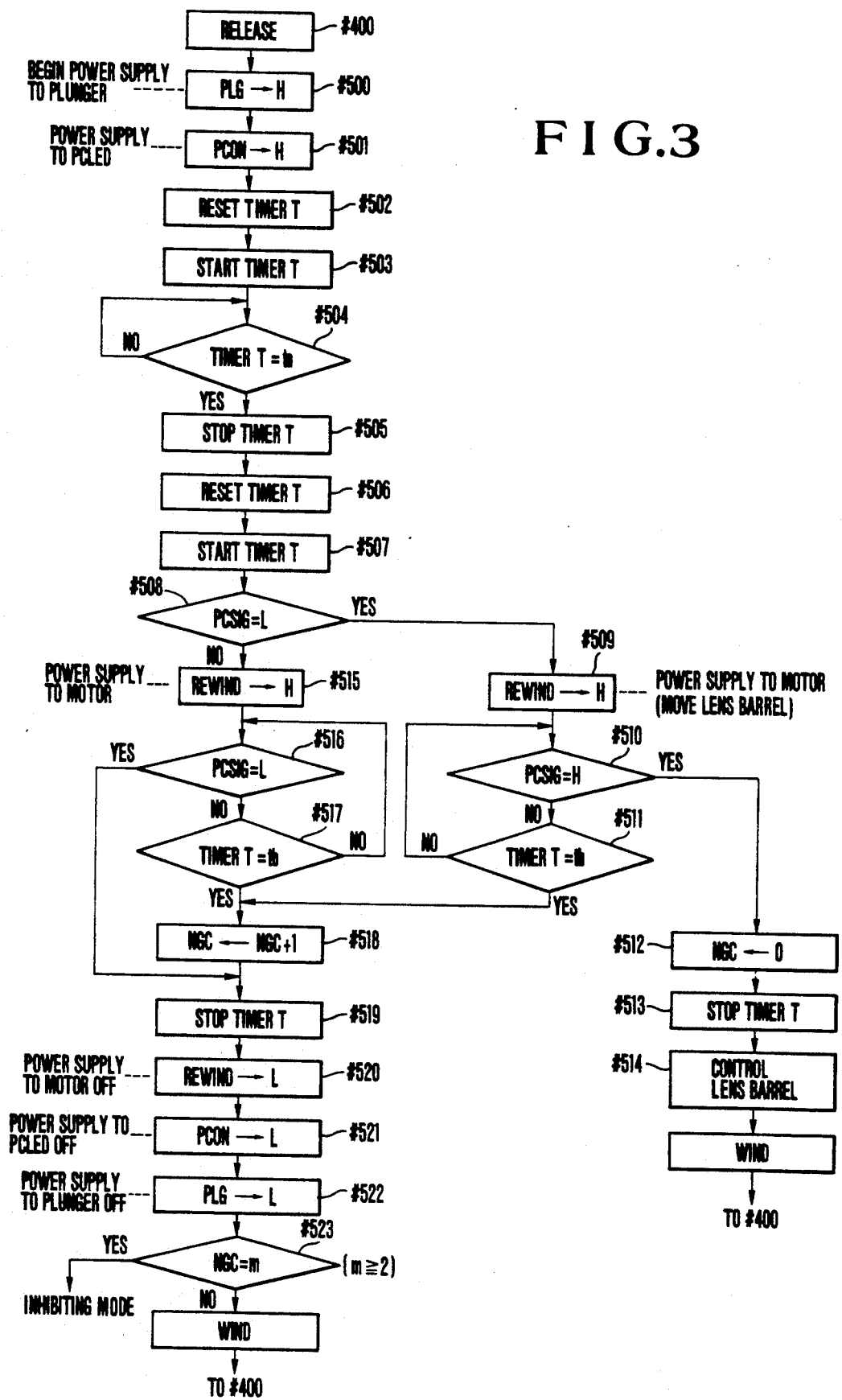

FIGS. 3 and 4 are flow charts showing the operation of the embodiment. In the case of this embodiment, the camera is arranged as follows: The lens barrel begins to perform its lens delivering action when the output of the motor 39, in the film rewinding direction, is transmitted under a condition in which a planetary mechanism arranged to transmit the output of the motor 39 to a film rewinding gear system meshes with a gear system disposed at an intermediate point of a path in which the planetary mechanism moves to the film rewinding gear. After completion of this action, the shutter opening and closing actions are time-serially performed.

Referring to FIG. 3, a release signal is supplied to the CPU 1 with a release operation performed at a step #400. Step #500: The level of the output PLG of the CPU 1 then becomes high. In the plunger driver 40 of FIG. 2(b), an operational amplifier 280, an output driving transistor 281, resistors 282, 283 and 284 which jointly form a plunger driver part come into enabled states through an inverter 286, a resistor 287 and a transistor 285. As a result, the plunger 41 becomes conductive. Step #501: The CPU 1 makes the level of its output PCON high. The high level output PCON is supplied to the photo-coupler detection circuit 42 of FIG. 2(c). In the photo-coupler detection circuit 42, a transistor 304 is turned off via an inverter 305 and a resistor 306. As a result, the LED 44 is energized by a current supplied from a constant current circuit which consists of a constant current source 303 and transistors 301 and 302. Steps #502 to #505: The timer T which is disposed inside the CPU 1 is actuated. After waiting for a predetermined period of time "ta" (a stabilizing period required for an oscillation circuit which is not shown), the flow of the program of operation proceeds to a step #506. Step #506: The timer T is reset. Step #507: The timer T starts again.

While the lens barrel is in its initial state, the pulse disc 45 of FIG. 1 remains stationary in a dark pattern position relative to the LED 44 and the light receiving element 43 which jointly form a photo-coupler. Under this condition, the amount of current detected by the light receiving element 43 is very small. Therefore, a voltage value which is obtained by converting the current of the light receiving element 43 into a voltage with a resistor 311 shown in FIG. 2(c) is amplified by a non-inverting amplifier which is composed of an operational amplifier 312 and resistors 313 and 314. The output of this non-inverting amplifier is compared with a reference voltage KVC by a comparator 315. Since this output is at a small value in this instance, the output PCSIG of the comparator 315 is at a low level.

Step #508: A check is made for the level of the output PCSIG. When the output PCSIG is found to be at a low level, the flow immediately proceeds to a step #509. Step #509: In the motor driver 38 of FIG. 2(a), the level of the output REWIND of the driver 38 is caused to become high (to be exact, a high impedance). The high level output REWIND causes the current of a constant current source 265 to be supplied to the base of a transistor 264 to turn it on. A transistor 253 is then turned on via resistors 255 and 266, and another transistor 256 is also turned on via a resistor 258. As a result, a current in the direction of an arrow B flows to the motor 39. This current causes the motor 39 to rotate in the film rewinding direction. The planetary mechanism which is arranged to transmit the output of the motor 39 comes to mesh with a gear system disposed at an intermediate point of a path in which the output of the motor 39 is transmitted to a film rewinding gear system. The output of the motor 39 is thus transmitted to the intermediate gear system. Meanwhile, the lens barrel has already been cancelled from a mechanically clamped state by the current supplied to the plunger 41 for the predetermined period of time "ta". Therefore, in this instance, the rotation of the motor 39 in the film rewinding direction which is caused by the above-stated output REWIND and transmitted to the gear system causes the lens barrel to begin to move.

When the lens barrel begins to move in a normal manner, the pulse disc 45 begins to rotate in synchronism with the movement of the lens barrel. Then, the position of the pulse disc 45 relative to the LED 44 and the light receiving element 43 gradually changes from a dark pattern to a bright pattern. When the bright pattern position of the disc 45 is thus obtained, a photo-current which is obtained by converting the light received by the light receiving element 43 increases. The increased photo-current is converted into a voltage by the resistor 311 and is then amplified by the non-inverting amplifier which is formed by the operational amplifier 312 and the resistors 313 and 314. The amplified output is compared with the reference voltage KVC by the comparator 315. When the former becomes larger than the latter, the level of the output PCSIG of the comparator 315 becomes high. Step #510: A check is made for the level of the output PCSIG of the comparator 315. If the output PCSIG is found to be at a high level, the flow immediately comes to a step #512. Step #512: The content of the abnormal action number-of-times storage part NGC arranged inside the CPU 1 to count and store the number of times for which an abnormal state of the lens barrel is detected is reset to "0". Step #513: The timer T is stopped. Step #514: The control of the lens barrel (and shutter opening and closing control) is caused to begin.

However, in a case where the plunger 41 is not released from the mechanically clamped state, due to some reason, even when a current supply is effected to the plunger 41, the lens barrel is not moved by the current supply to the motor 39. The pulse disc 45 then also does not rotate and remains in its dark pattern position. The level of the output PCSIG of the photo-coupler detection circuit 42 thus remains at a low level. Then, if the output PCSIG is not detected at a high level after the lapse of a predetermined period of time "tb" from commencement of the current supply in the film rewinding direction as shown in FIG. 5(b) which is a timing chart, unlike in a normal state which is shown in FIG. 5(a) which is also a timing chart, the flow comes from the step #511 to a step #518. Step #518: The value of the abnormal action number-of-times storage part NGC is incremented by one. Step #519: The timer T is stopped. Step #520: The level of the output REWIND of the CPU 1 is changed to a low level. As a result, the whole current of the constant current source 265 of the motor driver 38 comes to flow to the terminal of the CPU 1 which produces the output REWIND. All the transistors 264, 253 and 256 then turn off to stop the current supply to the motor 39. The flow then proceeds to a step #521. Step #521: The level of the output PCON of the CPU 1 is changed to a low level. This causes the transistor 304 to be turned on via the inverter 305 and the resistor 306. This brings into a disenabled state the constant current source circuit which consists of the constant current source 303 and the transistors 301 and 302. As a result, the light of LED 44 is put out. Step #522: The level of the output PLG of the CPU 1 is changed to a low level. Then, the transistor 285 of the plunger driver 40 shown in FIG. 2(b) is turned on via the inverter 286 and the resistor 287. This brings into a disenabled state the plunger driver part which consists of the operational amplifier 280, the transistor 281 and the resistors 282, 283 and 284. The current supply to the plunger 41 then comes to a stop. The flow then proceeds to a step #523. Step #523: A check is made to find if the value of the abnormal action number-of-times storage part NGC has reached a predetermined value "m", which is not less than 2. If not, a normal film winding action is performed and the flow comes back to the step #400. If the value of the part NGC is found to have reached the predetermined value "m", the flow immediately proceeds to a step #530 of FIG. 4. Referring to FIG. 4, at the step #530, the CPU 1 puts out the light of the film counter 37 via the film counter driver 36. This informs the photographer that the camera has come to take an inhibiting mode. The flow then proceeds to a step #531 to bring the switch interface 2 into a disenabled state. In this mode, all the switches 3 to 18 cease to accept any input. The flow lastly comes to a step #532 to bring the camera into an inoperative state with the program of operation stopped from being executed by stopping the oscillation of the CPU 1.

The foregoing has described the control operation to be performed when the initial state of the lens barrel is found to be normal at the step #508. If the lens barrel is deviating from its normal position and the pulse disc 45 is in a position to have a bright pattern in relation to the LED 44 and the light receiving element 43, the output PCSIG of the photo-coupler detection circuit 42 is found to be at a high level at the step #508. In that case, the flow of the program comes to a step #515. Step #515: A current supply to the motor 39 begins in the film rewinding direction. Meanwhile, the timer T has already been started at the step #507. Therefore, if the level of the output PCSIG becomes low before the counted value of the timer T reaches the predetermined period of time "tb", the pulse disc 45 is deemed to have been rotated by the movement of the lens barrel. In this instance, the flow immediately comes from a step #516 to a step #519. However, if the level of the output PCSIG still remains at a high level when the value of the timer T has reached the predetermined period of time "tb", the lens barrel is deemed to have not moved at all. In that instance, the flow comes to a step #518. Step #518: The value of the abnormal action number-of-times storage part NGC is incremented by one and the flow comes to the step #519. Step #519: The timer T is stopped. Steps #520 to #522: The current supply to the motor 39, the LED 44 and the plunder 41 is brought to a stop. Step #523: A check is made to find if the value of the abnormal action number-of-times storage part NGC has reached the predetermined value "m". If so, the camera is set into the inhibiting mode in the same manner as described in the foregoing. If not, the film is wound in a normal manner and the flow comes back to the step #400. Further, a photographing operation on a frame portion of the film thus obtained cannot be adequately performed as the lens barrel is not normally acting in this instance.

Figure 6:
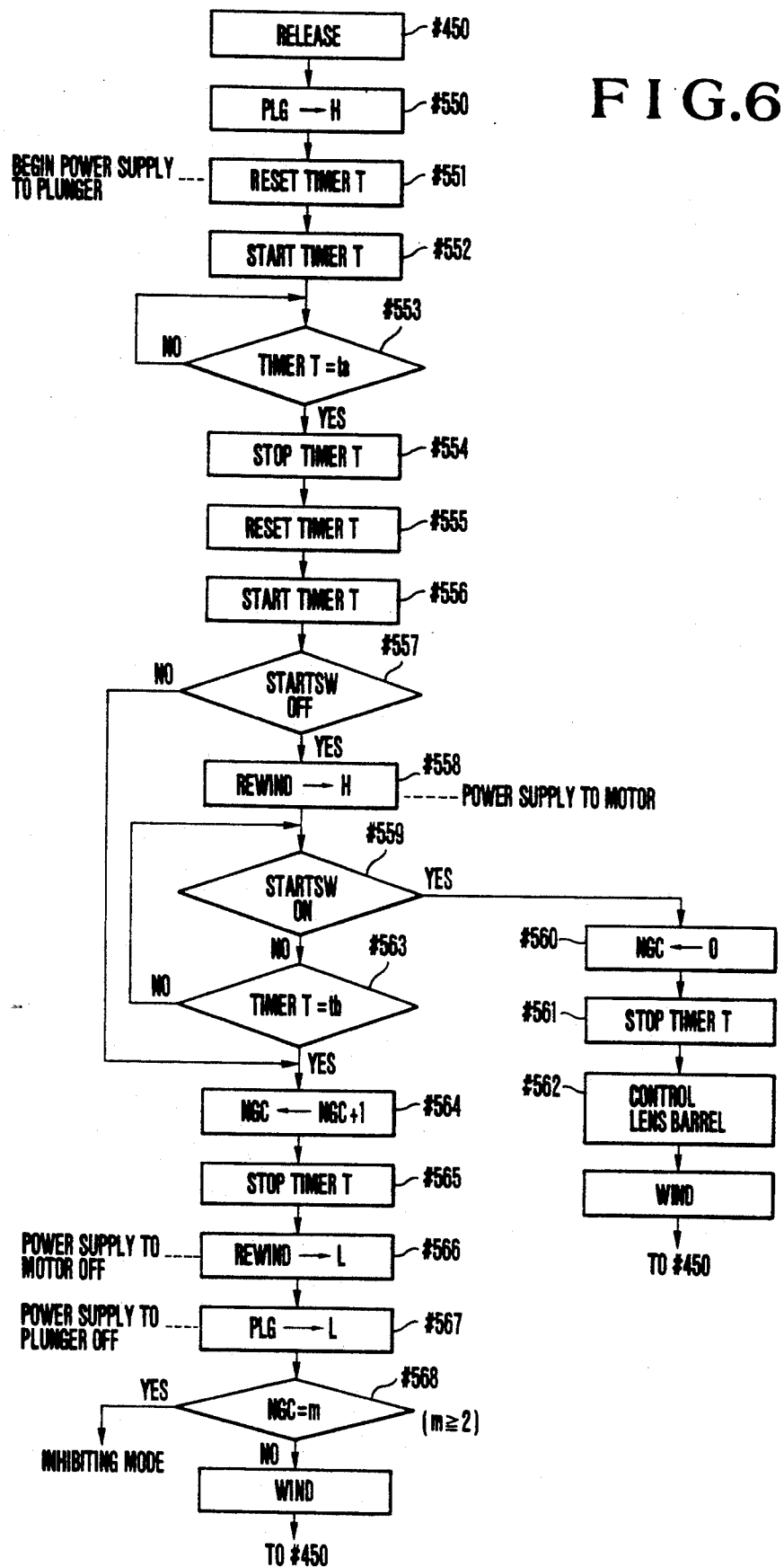
FIG. 6 is a flow chart showing the operation of another embodiment of the invention.

FIG. 6 is a flow chart showing the operation of a second embodiment of the invention in the arrangement shown in FIG. 1. In this case, the action of the lens barrel is controlled by means of a mechanical switch instead of using the photo-coupler which consists of the LED 44 and the light receiving element 43.

At a step #450, a release signal is supplied to the CPU 1 when a release operation is performed. Then, at a step #550, the level of the output PLG of the CPU 1 is changed to a high level. The high level output PLG of the CPU 1 brings the plunger driver 40 of FIG. 2(b) into an enabled state. A power supply then begins to be effected to the plunger 41. Step #551: The timer T is reset Step #552: The timer T starts. Step #553: The flow waits until the counted value of the timer T reaches a predetermined period of time value "ta". When the power supply to the plunger 41 is effected for a predetermined period of time with the value of the timer T having reached the predetermined period of time "ta", the flow proceeds to a step #554 to bring the action of the timer T to a stop. Step #555: The timer T is reset. Step #556: Again the timer T starts. Step #557: The state of a start switch (STARTSW) which is not shown is checked. If the lens barrel is not correctly in its initial position, the start switch is turned on from the beginning. In that case, the flow immediately comes to a step #564. However, if the lens barrel is correctly in its initial position, the flow proceeds to a step #558. Step #558: The level of the output REWIND is changed to a high level to cause a current to be supplied to the motor 39 of FIG. 2(a) in the direction of an arrow B (in the film rewinding direction). Step #559: Again the state of the start switch is checked. If the start switch is found not in an on state, the flow comes to a step #563 to make a check to see if the value of the timer T has reached the predetermined period of time "tb". In a case where the start switch is found to be in its on state before the lapse of the predetermined period of time "tb", the lens barrel is deemed to have correctly acted. In that case, the flow proceeds to a step #560. At the step #560, the value of the abnormal action number-of-times storage part NCG is reset to "0". Step #561: The timer T is stopped and the flow proceeds to a step #562 to have the lens barrel continuously controlled.

Meanwhile, if the start switch is not turned on after the value of the timer T reaches the predetermined period of time "tb", the lens barrel is deemed to be not moving at all. In that event, the flow proceeds to a step #564. At the step #564: The value of the abnormal action number-of-times storage part NCG, arranged to count the number of times for which the abnormal state of the lens barrel is repeatedly detected, is counted up by one. Step #565: Then, the timer T is stopped. Step #566: The level of the output REWIND is changed to a low level to turn off the current supply to the motor 39. Step #567: The level of the output PLG is changed to a low level to turn off the current supply to the plunger 41. Step #568: The abnormal action number-of-times storage part NGC is checked to see if the value thereof has reached the predetermined value "m" which is not less than 2. If so, the camera is immediately brought into the inhibiting mode. Then, as mentioned in the foregoing, the camera becomes inoperative accepting no external input. If the value is found not to have reached the predetermined value "m", the normal film winding action is performed and the flow comes back to the step #450.

According to the arrangement of the embodiment described, the camera is rendered inoperative only after the abnormal state of the lens barrel has been repeatedly detected for a plurality of times (two or more times in the case of this embodiment). This means that the camera is rendered inoperative only when the camera is really out of order. This arrangement effectively prevents the camera from being prematurely rendered inoperative in cases where some minor mechanical fault happens to cause an inadequate release operation only when the release operation is performed for the first time. The arrangement, therefore, enhances the practical operability of the camera.

In the case of the embodiment described above, the invention is applied to a camera of the kind performing the control of the lens barrel before a shutter opening and closing control is continuously performed. The camera is rendered inoperative after an inadequate control of the lens barrel has been repeatedly detected for a plurality of times. However, this arrangement may be changed to make the camera inoperative in a case where an inadequate shutter opening and closing control is detected for a plurality of times after the control of the lens barrel is performed in a normal manner. Further, in the event of a camera of the kind performing these control actions independently of each other, the camera may be arranged to be set into the inoperative state after either of these control actions has been repeatedly detected to be inadequate at least twice.

Further, for detection of the abnormal state, the embodiment is arranged by way of example to use a lens shifting member and a shutter opening and closing member. However, these members may be replaced with some other members such as a film transporting member or a mechanical release effecting member or the like.

Figure 7:
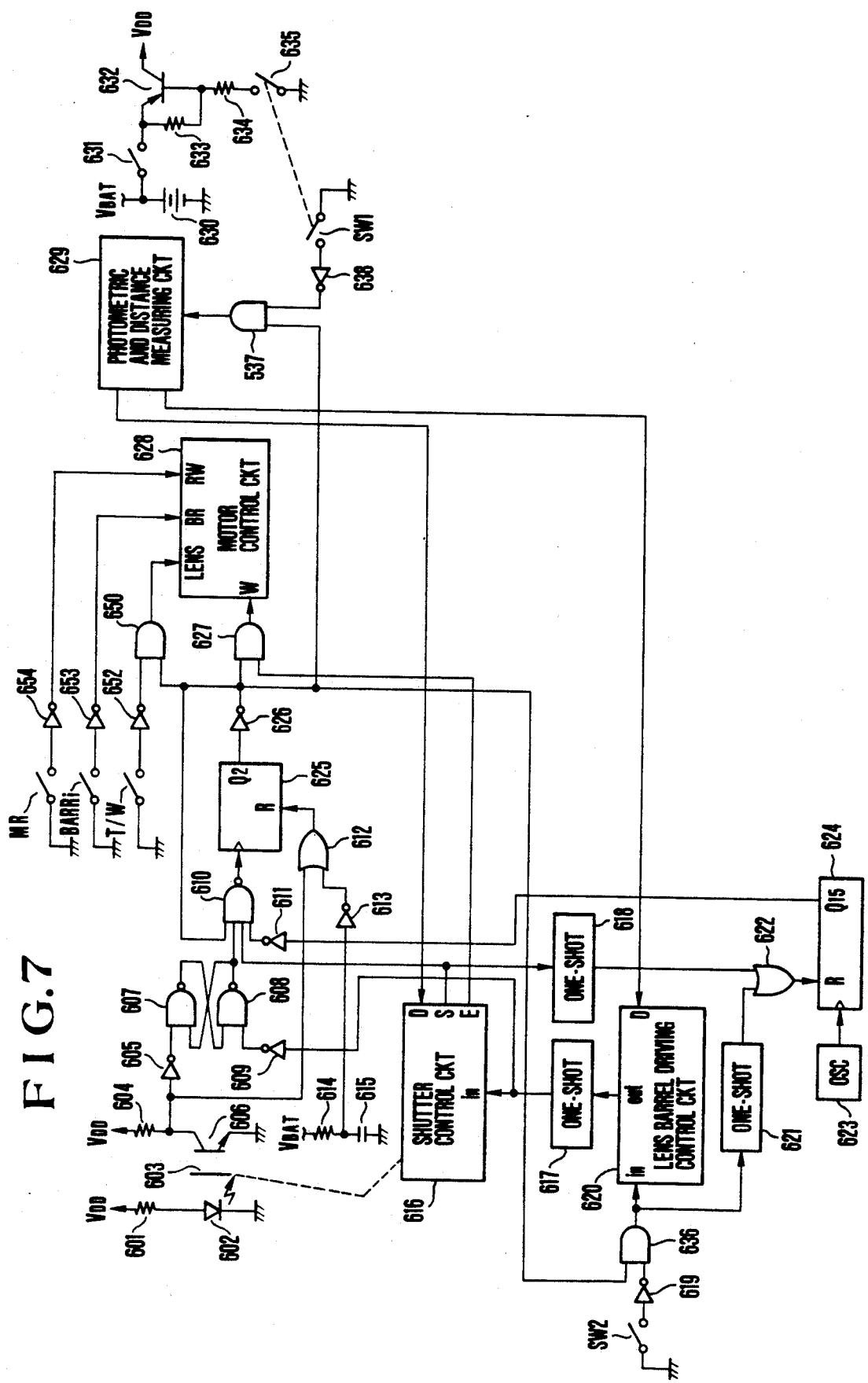
FIG. 7 is a circuit diagram showing a camera arranged as a further embodiment of the invention.

FIG. 7 is a circuit diagram showing a camera which is arranged as a third embodiment of this invention. The illustration includes a resistor 601; an LED 602; a shutter 603; a resistor 604; an inverter 605; a transistor 606; NAND gates 607 and 608; an inverter 609; a NAND gate 610; an inverter 611; an OR gate 612; an inverter 613; a resistor 614; a capacitor 615; and a shutter control circuit 616.

When a switch 631 which is employed as a main switch is turned on, a battery 630 is connected to resistors 633 and 634 and a transistor 632 which are arranged to perform a power supply switching action. When a shutter release button which is not shown is pushed down to a first step of stroke, a switch SW1 turns on. At the same time, a switch 635 turns on to allow a base current flow via the resistors 633 and 634 to the transistor 632 to turn it on. As a result, a circuit power supply VDD is produced. In a case where the shutter 603 is normally operating, a photometric and distance measuring circuit 629 begins to operate through an inverter 638 and an AND gate 637 as will be further described later. Then, the luminance of an object to be photographed and a distance to the object are measured through the output of a sensor which is not shown. The data for the luminance is transferred to the shutter control circuit 616 and the data for the object distance is transferred to a lens barrel driving control circuit 620. Next, when the shutter release button is pushed further down to the second step of stroke to turn on the switch SW2, the lens barrel driving control circuit 620 begins to operate through an inverter 619 and an AND gate 636. The lens barrel which is not shown is then drawn out and delivered from its infinity distance position for carrying out the automatic focusing action. At the same time, a signal is supplied to a one-shot circuit 621. One pulse is then supplied via an OR gate 622 to the reset terminal of a counter 624. This signal resets the counter 624 which is arranged to frequency-divide the output of an oscillator 623.

Upon completion of the automatic focusing action, a high level signal is produced from the terminal "out" of the lens barrel driving control circuit 620. This high level signal excites the shutter control circuit 616 via a one-shot circuit 617 and causes through the inverter 609 a latch circuit which consists of the NAND gates 607 and 608 to produce a high level signal. With the shutter control circuit 616 excited, the level of the terminal S of the shutter control circuit 616 becomes high to cause the shutter 603 to begin to open.

(i) In a case where the shutter 603 operates in a normal state:

The shutter 603 is provided with a slit opening. When the shutter 603 begins to operate, a current which flows via the resistor 601 causes the light of the LED 602 to be allowed to pass or to be blocked by the shutter. This causes the transistor 606 to turn on and off accordingly. When the light of the LED 602 is allowed to pass, the transistor 606 turns on to lower the input level of the inverter 605 which has been pulled up by the resistor 604. When, conversely, the light is blocked, the input level of the inverter 605 becomes high. The shutter has the slit opening thereof arranged to pass the light before shutter operation. Therefore, the output of the inverter 605 is at a high level before the shutter operation. The output level of the inverter 605 becomes low when the shutter operates. Then, the output level of the latch circuit comprised of the NAND gates 607 and 608 also becomes low. Accordingly, the output of the NAND gate 610 is fixed at a high level. As a result, there is no clock signal input to a counter 625. Further, the high level signal is supplied to the reset terminal R of the counter 625 via the OR gate 612. As a result, the output Q2 of the counter 625 remains at a low level. Therefore, the output of an inverter 626 is at a high level. With the operation of the shutter control circuit 616 coming to an end, when a high level signal is produced from the terminal E of the circuit 616, the output level of an AND gate 627 becomes high. The high level output of the AND gate 627 then causes the level of the terminal W of a motor control circuit 628 to become high. This excites the motor control circuit 628. Then, a film which is not shown is wound to an extent corresponding to one frame.

(ii) In a case where the shutter 603 operates in an abnormal state:

The camera operates in the same manner as the manner described above before the shutter control circuit 616 is excited. The operation up to that point is therefore omitted from the following description: When the shutter control circuit 616 is excited, the level of the terminal S of the circuit 616 becomes high. One pulse is supplied to an OR gate 622 through a one-shot circuit 618. The OR gate 622 then produces one pulse to instantly reset the counter 624. The counter 624 begins to count time from "0". Since the shutter 603 still remains inoperative, the latch output of the NAND gates 607 and 608 remains at a high level. After the lapse of a constant period of time, the level of the output Q15 of the counter 624 changes from a low level to a high level. This causes the output level of the inverter 611 to change from a high level to a low level. The output level of the NAND gate 610 changes from a low level to a high level to cause the content of the counter 625 to become "1". However, after the lapse of a predetermined period of time, when the level of the terminal E of the shutter control circuit 616 becomes high with the level of the output Q2 of the counter 625 still remaining at a low level, the motor control circuit 628 comes to operate to wind the film to an extent corresponding to one frame.

(iii) In a case where the shutter 603 operates in a normal state after an abnormal state:

The shutter 603 might become normally operative after it is first found to be inoperative due to a sticking state brought about by the action of static electricity or the like and is then brought back to its normal state by the disappearance of the electric charge. In this case, the shutter 603 comes to operate after a switch SW2 is turned on and the above-stated series of actions are performed with the content of the counter 625 having become "1". Then, the transistor 606 turns off to make the level of the input of the inverter 605 high. This causes the output level of the OR gate 612 to become high. The high level output of the OR gate 612 is supplied to the terminal R of the counter 625 to cause the content of the counter 625 to become "0". After that, the camera operates in the same manner as in the case (i) above.

(iv) In a case where the abnormal state of the shutter 603 has been consecutively detected twice:

When the shutter 603 again fails to operate after the abnormal state of the shutter 603 is first detected, the level of the output Q15 of the counter 624 becomes high as mentioned in the case (ii). Then, the output level of the NAND gate 610 changes from a low level to a high level. This causes the content of the counter 625 to become "2". The level of the output Q2 of the counter 625 becomes high. The output level of the inverter 626 then becomes low to fix the output of the NAND gate 610 at a high level. The NAND gate 610 then no longer accepts other inputs. At the same time, the motor control circuit 628 becomes no longer excitable as the output of the AND gate 627 is fixed at a low level even when the level of the terminal E of the shutter control circuit 616 becomes high. In other words, no film transporting action can be allowed any longer. Further, since the output levels of both the AND gates 636 and 637 become low, no input becomes acceptable from the switches SW1 and SW2. The camera becomes inoperative and no photographing operation is possible thereafter.

Further, under the above-stated condition, the output level of the AND gate 650 is forcedly set at a low level as the output level of the inverter 626 becomes low. Therefore, even if the output level of the inverter 605 is changed to a high level by turning on a switch T/W which is provided for the purpose of selecting a focal length, the output level of the AND gate 650 remains at a low level to prevent the signal of the switch T/W from reaching the motor control circuit 628. Therefore, after the camera becomes inoperative as mentioned above, the motor control circuit 628 is inhibited from shifting the lens barrel for changing the focal length of the lens.

However, when a switch BARRi which is provided for drawing inward the lens barrel to the shortest possible length thereof and for covering the front face of a photo-taking lens by a barrier for the purpose of carrying the camera is turned on by a manual operation performed from outside, a signal is produced. This signal is arranged to be supplied directly to the motor control circuit 628 without passing through the AND gate 650. In this case, the signal drives the motor control circuit 628 to shift the lens barrel to the shortest length position and allows the front face of the lens to be covered by the barrier, irrespective of the above-stated inoperative state of the camera brought about by the low output level of the inverter 626.

Further, when a switch MR which is arranged to be operated also from outside for rewinding the film is turned on, a signal thus produced is also directly supplied to the motor control circuit 628 without passing through the AND gate 650. In that case, therefore, the signal causes the motor control circuit 628 to operate to have the film rewound irrespective of the inoperative state of the camera brought about by the low output level of the inverter 626.

In a case where the shutter 603 is continuously found to be in an abnormal state, the embodiment operates in the above-stated manner to bring the camera into an inoperative state. This informs the photographer that the camera is out of order. Then, to protect the photographed portion of the film during a period before the camera in question is brought to a repair shop, the film can be rewound back to the inside of a film cartridge by turning on the switch MR. Further, to facilitate carrying the camera to the repair shop, the switch BARRi can be operated to cover the photo-taking lens by the barrier with the lens barrel shifted to the farthest drawn-in (contracted) position.

Further, in order to relieve the camera from the inoperative state, the battery 630 is temporarily taken out from the camera to lower the level of the voltage VBAT and, after that, is again inserted into the camera. Then, a pulse signal which is generated by the time constant of the resistor 614 and the capacitor 615 is supplied to the terminal R of the counter 625 via the inverter 613 and the OR gate 612 to cause the content of the counter 625 to become "0". This operation is effected during the process of the repair work.

With the inoperative state canceling operation performed in the above-stated manner, the output level of the inverter 626 becomes high to enable the AND gates 636 and 637 to receive inputs from the switches, so that the operation of the camera can be performed in a normal manner.

Figure 8:
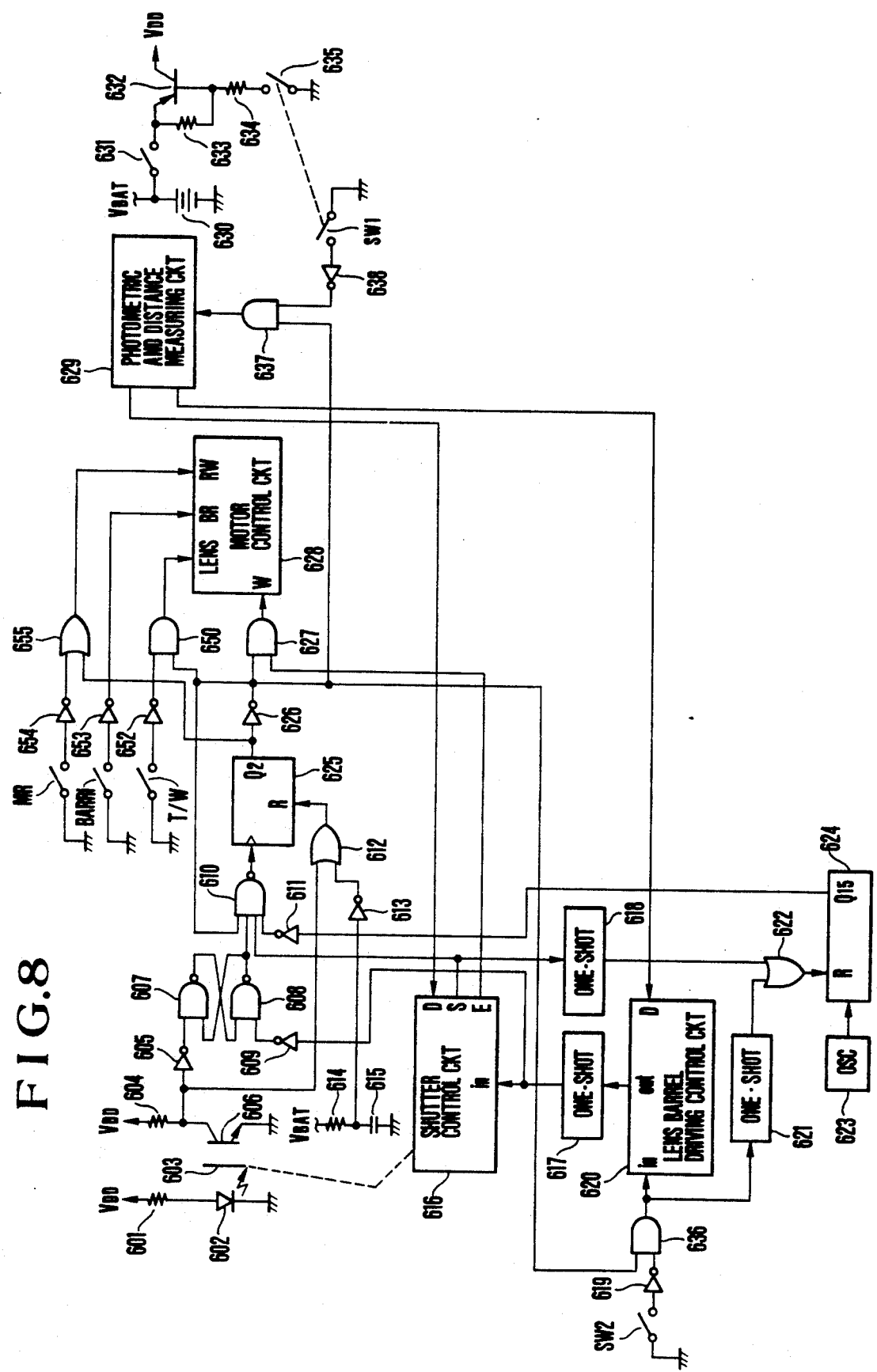
FIGS. 8, 9 and 10 are circuit diagrams respectively showing other embodiments of the invention.

FIG. 8 shows a fourth embodiment of the invention. This embodiment is arranged as follows: In a case where the camera becomes inoperative with the abnormal state of the shutter consecutively detected, the film is automatically rewound, so that the photographed film portion can be automatically protected. With the exception of this point, the embodiment is arranged in the same manner as in the case of the third embodiment shown in FIG. 7. Therefore, the following description of the fourth embodiment is limited to the differing point while, in FIG. 8, the parts which are the same as in the third embodiment are indicated by the same reference numerals as in FIG. 7.

Referring to FIG. 8, when the level of the output Q2 of the counter 625 becomes high after the abnormal state of the shutter 603 is consecutively detected, the camera becomes inoperative, and the level of the output of the OR gate 655 becomes high, so that the terminal RW of the motor control circuit 628 is excited. The motor control circuit 628 then drives the film in the rewinding direction to bring the photographed portion of the film back to the inside of the film cartridge. The photographed film portion is thus automatically protected after the camera becomes inoperative.

Figure 9:
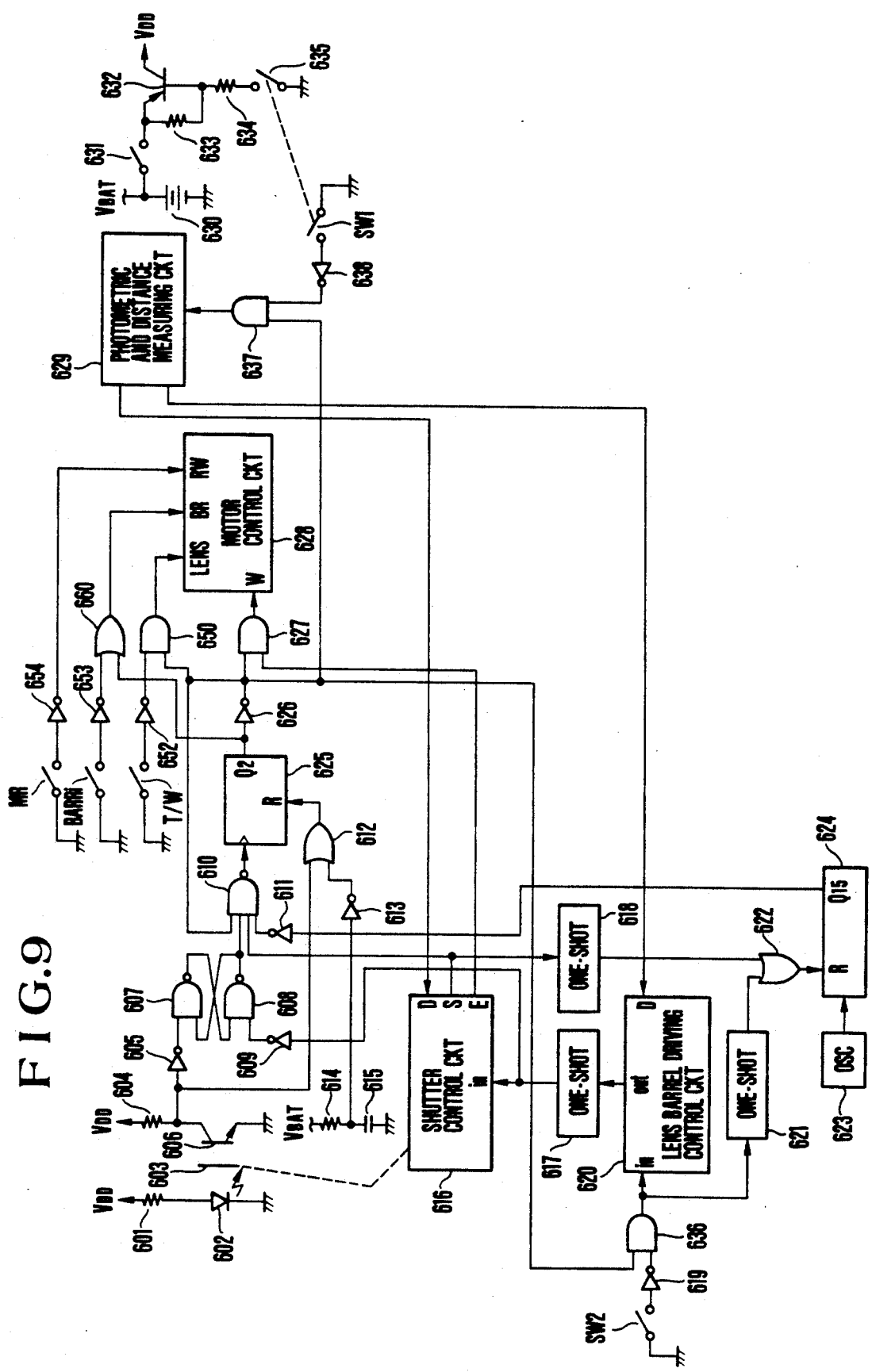

FIG. 9 shows a fifth embodiment of this invention. This embodiment is arranged to automatically bring the camera into an easily portable state by automatically shifting the lens barrel from an expanded state to a most contracted state and by closing the barrier thereof after the camera becomes inoperative with an abnormal state of the shutter having been consecutively detected. With the exception of that point, the embodiment is arranged in the same manner as the embodiment shown in FIG. 7. In FIG. 9, the same component parts as those of the embodiment shown in FIG. 7 are indicated by the same reference numerals as in FIG. 7. The following description of the fifth embodiment is limited to the above-stated differing point while the details of the same parts as those of FIG. 7 are omitted from the description.

Referring to FIG. 9, when the level of the output Q2 of the counter 625 becomes high with the abnormal state of the shutter having been consecutively detected, the camera becomes inoperative, and the level of the output of the OR gate 660 becomes high, so that the terminal BR of the motor control circuit 628 is excited. Then, the lens barrel is driven to automatically shift the lens barrel from an expanded state back to the most contracted position thereof and to close the barrier of the lens. The embodiment is thus arranged to prevent any inconvenience in carrying the camera after it is rendered inoperative.

As described in the foregoing, the fourth and fifth embodiments of the invention are arranged to automatically rewind the film and to automatically shorten the length of the lens barrel by closing the barrier when the camera is rendered inoperative after an abnormal state of the shutter is repeatedly detected. These two different protective actions, however, may be arranged either to be simultaneously performed or to have one performed before the other.

Figure 10:
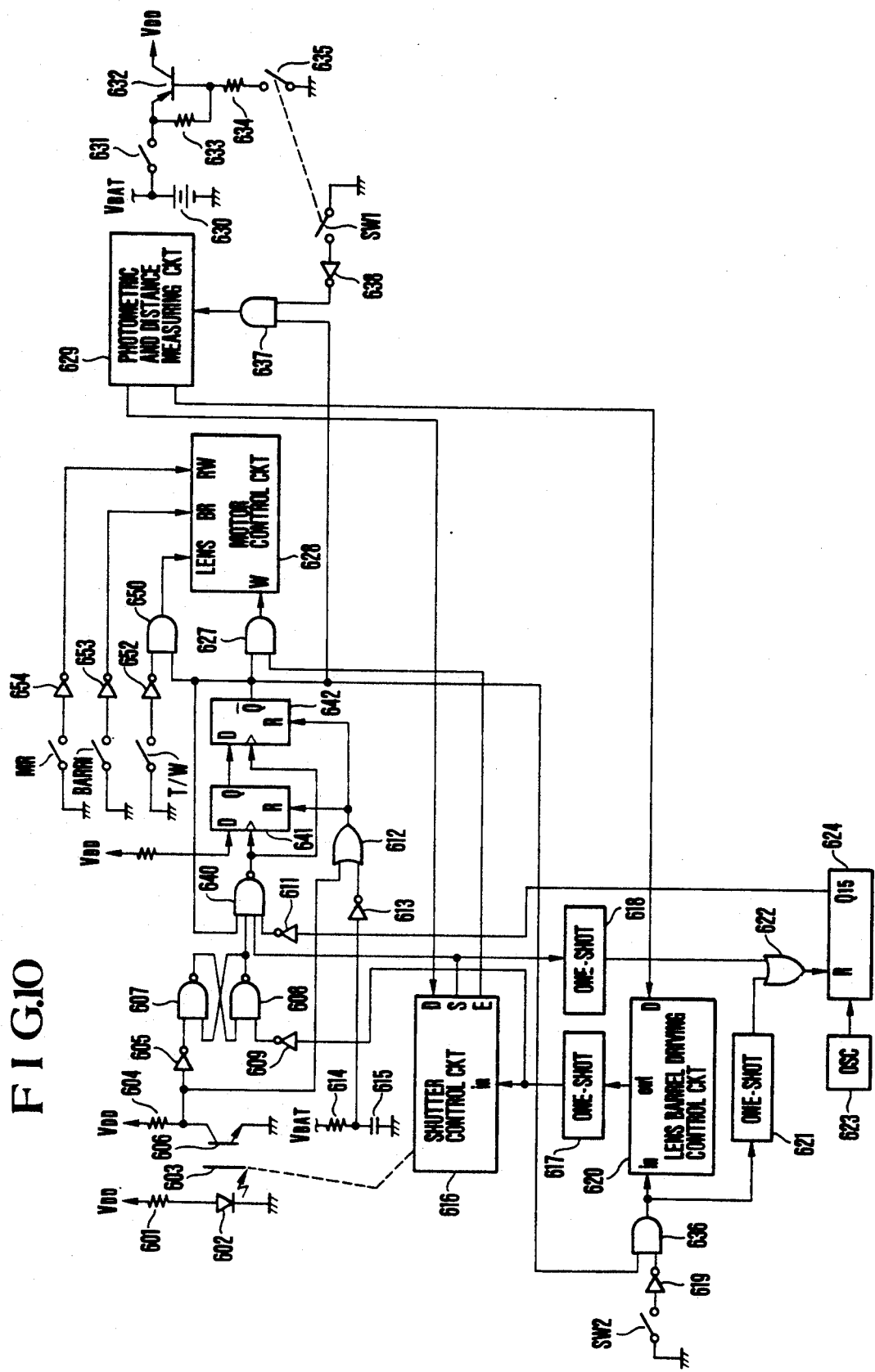

FIG. 10 shows a sixth embodiment of the invention. While the embodiments shown in FIGS. 7 to 9 are arranged to use the counter in repeatedly detecting an abnormal state of the shutter, the sixth embodiment is arranged to use a shift register in place of the counter. With the exception of this point, the sixth embodiment is arranged in the same manner as the preceding embodiments shown in FIGS. 7, 8 and 9. Hence, in FIG. 10, the same component parts as those of FIGS. 7 to 9 are indicated by the same reference numerals. Further, while the circuit arrangement of FIG. 10 corresponds to that of the embodiment shown in FIG. 7, the circuit arrangement of FIG. 10 is of course likewise applicable to other embodiments other than the embodiment shown in FIG. 7. Referring to FIG. 10, the sixth embodiment operates as follows:

(i) In a case where the shutter 603 operates in a normal state:

The pulse obtained by means of the slit provided in the shutter 603 is supplied to the OR gate 612. Then, the output of the OR gate 612 is supplied to the terminals R of D flip-flops 641 and 642 (hereinafter referred to as D-FFs). These D-FFs 641 and 642 are reset. This causes the output $\overline{Q}$ of the D-FF 642 to remain at a high level. Further, when the input level of the inverter 605 becomes high, i.e. when the light of the LED 602 is blocked by the slit part of the shutter 603, the output level of the inverter 605 becomes low. The low level output of the inverter 605 keeps the latch output of the NAND gates 607 and 608 at a low level. As a result the output of the NAND gate 640 is fixed at a high level. After that, the output level of the NAND gate 640 remains unchanged by the change of any other inputs thereof. Therefore, the outputs of the D-FFs 641 and 642 also do not change.

(ii) In a case where the shutter 603 operates in an abnormal state:

No pulse is obtained through the slit of the shutter 603. Therefore, the latch output of the NAND gates 607 and 608 is at a high level. When the output Q15 of the counter 624 changes from a low level to a high level after the lapse of a constant period of time, the output level of the NAND gate 640 changes from a low level to a high level. The rise of a pulse thus obtained changes the level of the output Q of the D-FF 641 from a low level to a high level. However, at the same time as the rise of the pulse, the input D of the D-FF 642 is still at a low level. Therefore, the level of the output $\overline{Q}$ of the D-FF 642 remains unchanged. By this, information on the failure of the shutter 603 is stored for the first time.

(iii) In a case where the shutter 603 operates in a normal state after an abnormal state thereof has been first detected:

The embodiment operates in the same manner as in the case of (iii) of the foregoing description of the embodiment shown in FIG. 7. In this instance, the D-FFs 641 and 642 are reset by the pulse obtained through the slit of the shutter 603. As a result, the level of the output Q of the D-FF 641 becomes low.

(iv) In a case where the abnormal state of the shutter 603 has been consecutively detected twice:

After the occurrence of the state resulting from the abnormal operation of the shutter 603 mentioned in the case (ii), the level of the output Q15 of the counter 624 again changes from a low level to a high level. This causes the level of the output Q of the NAND gate 640 to change from a low level to a high level. The input D of the D-FF 642 is at a high level. Therefore, the level of the output $\overline{Q}$ of the D-FF 642 changes from a high level to a low level. The output level of the AND gate 627 then becomes low. The output level of the NAND gate 640 is fixed at a high level and remains at a high level even when any of other inputs change. The camera is thus kept in an inoperative state.

To cancel this inoperative state, the embodiment employs the same method as in the case (iv) of the foregoing description of the embodiment shown in FIG. 7. Like in the case of the embodiment of FIG. 7, the embodiment is also arranged to permit the operation of the switches MR and BARRi even while the camera is in the above-stated inoperative state.

In the cases of all the embodiments shown in FIGS. 7 to 10, the number of times for which an abnormal state is detected before rendering the camera inoperative is arranged to be two times. However, the number of times is not limited to two times. It is of course may be three times or more than three times. In the case of three times, for example, the outputs Q1 and Q2 of the counter 625 of FIG. 7 are arranged to be supplied to a two-input AND gate with the AND gate connected to the inverter 626. Further, in the case of FIG. 10, the camera can be modified for this purpose by increasing the shift register arrangement of the D-FFs 641 and 642 to a three-step arrangement.

Further, in the cases of the embodiments shown in FIGS. 7 to 10, the camera is arranged to detect an abnormal state of the shutter. However, this invention is of course applicable also to a camera which is arranged to detect an abnormal state of a component part other than the shutter.

What is claimed is:

1. A camera comprising:
   a) a movable member which performs an operation for photography;
   b) a control circuit which controls a sequence of a serial photographing operations of the camera, part of the sequence of serial photographing operations being occupied by the operation performed by the movable member and the operation being performed by the movable member during performance of a normal sequence of photographing operation of the camera;
   c) an abnormal state detecting means for detecting an abnormal state of the camera, said detecting means detecting a driving state of the movable member during the performance of the normal sequence of photographing operations of the camera, the judging said abnormal state of the camera when the movable member does not assume a predetermined drive state;

d) counting means for counting the number of times which the normal state of the camera is detected by said abnormal state detecting means; and e) restricting means for restricting said sequence of serial operations of the camera in response to counting by said counting means of a plural number of times of detection of the abnormal state of the camera by said abnormal state detecting means.

2. A camera according to claim 1, wherein said restricting means includes means for prohibiting a photographic operation.

3. A camera according to claim 1, wherein said restricting means includes means for prohibiting an input of a release switch.

4. A camera according to claim 1, wherein said restricting means includes means for displaying a state of the restriction.

5. A camera according to claim 1, wherein said restricting means includes means for informing a state of the restriction.

6. A camera according to claim 1, wherein said abnormal state detecting means includes a means for detection of an operation state of a shutter.

7. A camera according to claim 1, wherein said abnormal state detecting means includes means for detecting an operation state of the camera.

8. A camera according to claim 7, wherein said abnormal state detecting means includes means for optically detecting the operation state of the camera.

9. A camera according to claim 7, wherein said abnormal state detecting means includes means for mechanically detecting the operation state of the camera.

10. A camera according to claim 7, further comprising means for repeating the operation of the camera at the time of and in response to the detection of the abnormal state of the camera by said abnormal state detecting means.

11. A camera according to claim 10, wherein said counting means includes means for performing the counting of the abnormal state of the camera detected by said abnormal state detecting means every time the operation is repeated.

12. A camera according to claim 7, further comprising means for repeating a sequence including the camera operation at the time of the detection of the abnormal state in response to the detection of the abnormal state of the camera by the abnormal state detecting means.

13. A camera according to claim 12, wherein said counting means includes means for performing the counting of the abnormal state of the camera detected by said abnormal state detecting means every time the operation is repeated.

14. A camera according to claim 1, wherein said abnormal state detecting means includes means for detecting that the operation of the camera does not change for a predetermined time.

15. A camera comprising:

a) a movable member which performs an operation for photography, b) a control circuit for controlling a sequence of serial photographing operations of the camera, said sequence including at least a predetermined first operation and other plural operations performed by a movement of said movable member, c) state detecting means for detecting a drive state of said movable member at the time when the first operation is performed in the sequence of serial photographing operations of the camera, and judging whether the movable member does not assume a predetermined drive state, and d) a judging circuit which judges an abnormal state when judging results by the detecting means at the time of the first operation performed by the movable in each sequence in each sequence of serial photographing operations of the camera do not show the predetermined drive state repeatedly more than once.

16. A camera according to claim 15, wherein said control circuit shifts the sequence of serial photographing operations to a sequence different from a normal one when judging circuit judges the abnormal state.

17. A camera according to claim 16, wherein the sequence different form the normal one is prohibiting a photographing operation.

18. A camera according to claim 17 wherein said sequence different from the normal one is for prohibiting a response of the control circuit to a release operation member.

19. A camera according to claim 15, wherein said control circuit starts the sequence of serial photographing operations at every operation of a release operation member.

* * * * *